United States Patent Office 2,890,986
Patented June 16, 1959

2,890,986
PROCESS FOR PREPARING KALLIKREIN INACTIVATOR

Heinrich Kraut and Ruth Körbel, Dortmund, Germany, assignors to Farbenfabriken Bayer Aktiengesellschaft, Leverkusen, Germany, a corporation of Germany No Drawing. Application May 27, 1955
Serial No. 511,765

Claims priority, application Germany May 29, 1954

1 Claim. (Cl. 167—74)

This invention relates to the production of an inactivator for the circulatory hormone kallikrein. The inactivator of kallikrein, which can be found in the lymph glands and the parotid glands as well as in the pancreas, liver, spleen and blood of cattle was first prepared by H. Kraut, E. K. Frey and E. Werle by extracting the dried organs with water or dilute acetic acid and by precipitating the inactivator from these extracts by addition of ethanol. C. F. Hoppe-Seyler's Z. physiol. Chem., 192, 1 (1930).

It has been further proposed to precipitate the proteins from the extracts by addition of trichloroacetic acid and then to precipitate inert materials with ethanol at a slightly alkaline pH. Thus, purer preparations are obtained.

It is an object of the invention to provide an improved process for the production of the kallikrein-inactivator. We have found, that the kallikrein inactivator is soluble in hot dilute alcohol at a weakly acid pH so that it is possible to extract the same directly from the animal organs or the blood serum at 50° C. with 70 percent ethanol containing acetic acid. Thus, substantially all of the proteins are precipitated so that extracts of the inactivator of a satisfactory degree of purity are obtained in better yields than in the older processes. The precipitation of proteins with trichloroacetic acid becomes unnecessary. The extracts can be concentrated by evaporation in vacuo without loss of activity. The residue can be extracted with ether to remove fats and coloring matter.

Thereupon the inactivator is precipitated from its solution by the addition of ethanol, acetone or another organic solvent miscible with water. The inactivator is at this stage primarily accompanied by substances which are soluble in dilute acids. A further purification can therefore be carried out by adjusting the solution to an alkaline pH by the addition of ammonia. This addition produces a dense precipitate which contains only very little inactivator. The degree of purity is 2–3 micrograms per inactivator unit.

Example 1

1000 grams of parotid glands of cattle, which were freed of fat and flesh are comminuted in a meat chopper and twice extracted with 5000 milliliters of acetone. The acetone is removed as far as possible by sucking off and the moist material is digested for 2½ hours in 1200 milliliters of N-acetic acid and 2800 milliliters of 96 percent ethanol at 50° C. The filtrate contains about 230,000 inactivator units.

The alcoholic solution is concentrated to 1200 milliliters by evaporating in vacuo and shaken with an equal amount of ether. Dark coloring matters and residues of fat are thus dissolved. The aqueous phase is now mixed with acetone until a precipitate occurs and the precipitate dissolved in dilute acetic acid. The solution is brought to a weakly alkaline pH by addition of ammonia. It is then centrifuged and the inactivator is precipitated with five times the amount of ethanol. The yield amounts to about 180,000 kallikrein inactivator units in 0.4–0.5 gram of substance.

Example 2

1000 grams of cattle pancreas are comminuted in the meat chopper and extracted twice with five liters of acetone. The extract is further worked up as the parotid gland-extract of Example 1. After precipitating with alcohol and drying with ether the yield amounts to 20,000 inactivator units in 0.5 gram of dry powder.

Example 3

4000 milliliters of cattle blood serum are stirred for two hours at 50° C. with 250 milliliters of acetic acid and 10,000 milliliters of ethanol. The acid alcoholic extract contains 50,000 inactivator units. The solution is worked up as in Example 1. After precipitating with ethanol and drying with ether the yield amounts to 10,000 inactivator units in three grams of dry powder.

Example 4

1000 grams of cattle liver are comminuted in the meat chopper and extracted twice with five liters of acetone. The solution is further worked up as in Example 1. The yield amounts to 10,000 inactivator units in 1.1 grams of dry powder after drying with ether.

Example 5

1000 grams of cattle spleen are comminuted in the meat chopper and extracted twice with five liters of acetone. The solution is worked up as in Example 1. The acid ethanolic extract contains 95,000 inactivator units. After precipitating with ethanol and drying with ether the yield amounts to 41,000 inactivator units in 0.4 gram of dry powder.

Example 6

1000 cc. of cattle colostrum of the first day are diluted with 1000 milliliters of distilled water. After the addition of 120 milliliters of glacial acetic acid and 4600 milliliters of methanol it is extracted for one hour at 50° C. In the alcoholic filtrate there are found 4000 inactivator units. The solution is further worked up as in Example 1. After precipitating with ethanol and drying with ether the yield amounts to 2300 inactivator units in 0.2 gram.

We claim:

The process for producing an inactivator for the circulatory hormone kallibrein, which process comprises extracting animal organs selected from the group consisting of lymph glands, parotid glands, pancreas, liver, spleen, blood and colostrum with dilute acid aqueous ethanol consisting of about 28 parts of ethanol and 12 parts of N-acetic acid at a temperature of about 50° C., concentrating the extract in vacuo, extracting the concentrated extract with ether to remove impurities from the aqueous phase, adding an organic solvent miscible with water selected from the group consisting of ethanol and acetone to said aqueous phase to precipitate the kallikrein inactivator, dissolving the recovered precipitate in dilute acetic acid, adjusting the solution obtained to a pH of 7.5 to 8.5, removing precipitated impurities therefrom, again adding an organic solvent miscible with water to precipitate the inactivator and recovering the same as a dry powder.

References Cited in the file of this patent
UNITED STATES PATENTS 1,469,994    Banting _____ Oct. 9, 1923

OTHER REFERENCES

Gardner: Am. J. Physiology, vol. 142, Aug.-Dec. 1944, pp. 541–543.